(12) United States Patent
Su et al.

(10) Patent No.: US 9,034,457 B2
(45) Date of Patent: May 19, 2015

(54) PHOTOCHROMIC DEVICES AND METHODS FOR MAKING THE SAME

(75) Inventors: Linli Su, Stow, OH (US); Ludmila Sukhomlinova, Kent, OH (US); Bahman Taheri, Shaker Heights, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 1002 days.

(21) Appl. No.: 12/438,838

(22) PCT Filed: Sep. 10, 2007

(86) PCT No.: PCT/US2007/019632
§ 371 (c)(1),
(2), (4) Date: Feb. 25, 2009

(87) PCT Pub. No.: WO2008/033291
PCT Pub. Date: Mar. 20, 2008

(65) Prior Publication Data
US 2009/0305002 A1   Dec. 10, 2009

Related U.S. Application Data

(60) Provisional application No. 60/843,600, filed on Sep. 11, 2006.

(51) Int. Cl.
*G03C 1/73* (2006.01)
*B05D 5/06* (2006.01)
*B05D 7/02* (2006.01)
*C09K 9/02* (2006.01)
*G02B 5/23* (2006.01)
*G03C 1/685* (2006.01)

(52) U.S. Cl.
CPC ... *G03C 1/73* (2013.01); *C09K 9/02* (2013.01); *G02B 5/23* (2013.01); *G03C 1/685* (2013.01)

(58) Field of Classification Search
CPC ............ C09K 9/02; G03C 1/73; G03C 1/685; G02B 5/23
USPC ......................................................... 428/174
See application file for complete search history.

(56) References Cited

U.S. PATENT DOCUMENTS

| | | | |
|---|---|---|---|
| 3,329,502 A | 7/1967 | Ullman | 96/90 |
| 4,756,973 A | 7/1988 | Sakagami et al. | 428/412 |
| 5,208,132 A * | 5/1993 | Kamada et al. | 430/138 |
| 5,312,868 A | 5/1994 | Abe et al. | 525/124 |
| 5,531,940 A | 7/1996 | Gupta et al. | 264/1.7 |
| 7,036,932 B2 | 5/2006 | Boulineau et al. | 351/163 |

(Continued)

FOREIGN PATENT DOCUMENTS

| | | | |
|---|---|---|---|
| JP | 03 269507 | 12/1991 | G02C 7/10 |
| JP | 2005 181426 | 7/2005 | G02C 7/10 |

(Continued)

*Primary Examiner* — Maria Veronica Ewald
*Assistant Examiner* — Nancy Johnson
(74) *Attorney, Agent, or Firm* — Renner Kenner Greive Bobak Taylor & Weber (57) ABSTRACT

A mixture used in photochromic devices comprises a photochromic dye and a thermoset adhesive. An optical device using the mixture may include a carrier substrate which may then be secured to another substrate or a lens. Assembly of the carrier substrate and mixture to another substrate and/or lens may be accomplished by thermoforming, lamination, insert molding or the like.

23 Claims, 6 Drawing Sheets

(56) References Cited

U.S. PATENT DOCUMENTS

| | | | |
|---|---|---|---|
| 7,094,368 B2 | 8/2006 | Kim et al. | 252/586 |
| 7,262,295 B2 | 8/2007 | Walters et al. | 544/106 |
| 7,350,917 B2 | 4/2008 | Kawai et al. | 351/163 |
| 2003/0052838 A1* | 3/2003 | Kim et al. | 345/32 |
| 2003/0141490 A1* | 7/2003 | Walters et al. | 252/585 |
| 2004/0126587 A1 | 7/2004 | Maki et al. | 428/412 |
| 2005/0063199 A1* | 3/2005 | Levy et al. | 362/565 |
| 2005/0168689 A1* | 8/2005 | Knox | 351/163 |
| 2007/0001155 A1 | 1/2007 | Walters et al. | 252/586 |
| 2007/0177100 A1 | 8/2007 | Knox | 351/163 |

FOREIGN PATENT DOCUMENTS

| | | | | |
|---|---|---|---|---|
| JP | 2005 215640 | | 8/2005 | G02C 7/02 |
| JP | 2006 030852 | | 2/2006 | G02C 7/10 |
| WO | WO 2006024099 A1 * | | 3/2006 | |

* cited by examiner

PHOTOCHROMIC DEVICES AND METHODS FOR MAKING THE SAME

CROSS REFERENCE TO RELATED APPLICATIONS

This application claims priority of U.S. Provisional Application Ser. No. 60/843,600 filed Sep. 11, 2006, which is incorporated herein by reference.

TECHNICAL FIELD

This invention relates to photochromic devices. More particularly, this invention relates to devices that change optical characteristics as a result of exposure to ultraviolet light. Specifically, this invention relates to photochromic devices that exhibit accelerated transitional properties upon exposure to and removal of ultraviolet light.

BACKGROUND ART

Coatings and material layers are often applied to optical elements such as ophthalmic lenses, sunglasses, visors, windshields, windows, etc. for controlling the characteristics of light passing through these elements.

An exemplary light controlling device are "photochromic" sunglasses. This device's apparent color (the amount of light they absorb at a particular wavelength or range of wavelengths) reversibly changes in response to the intensity of light with which they are illuminated. Typically, the photochromic reaction is in response to bright ultraviolet illumination, while the enhanced absorption is at visible wavelengths. These devices rely on a reversible photo-induced chemical reaction in which a dye molecule absorbs ultraviolet photons, changes either chemically or conformationally, and the reaction product has an altered absorption characteristic of visible light. These familiar eyeglasses become dark in bright sunlight, and return to clear when indoors in a dimmer environment. These devices have the drawback that the degree to which the absorption changes is controlled entirely by the intensity of ambient ultraviolet light, and not by the wearer. Another drawback of these known devices is their perceived slowness in transitioning between dark and clear conditions.

Typical photochromic sunglasses take ten to fifteen minutes to revert from a dark state to a clear state. Notable prior art, U.S. Pat. No. 4,549,894, describes photochromic glass that regains a transmissivity 1.75 greater than it possesses in the fully darkened state 300 seconds after the activating illumination is removed. A variation on eyewear exhibiting this functionality exists, such as disclosed in U.S. Pat. No. 5,552,841, but it employs electro-optic means of controlling the light transmission in conjunction with electric-eye type devices.

In known photochromic devices, a photochromic dye and solvent mixture are prepared. This mixture is then applied onto an appropriate glass or plastic substrate such as an optical lens. This mixture imbibes or otherwise migrates into the substrate. Upon evaporation or removal of the solvent, the photochromic dye is retained by the substrate so that the lens switches between a transparent state and a colored state upon exposure to and removal of ultraviolet light. It is documented that such devices have a "transition-half time" of, at best, four to five minutes. Transition-half time is normally expressed as $t_{1/2}$ and is defined as the time in seconds required for the device to return to an Optical Density of one-half the equilibrium value. Although such limited-feature devices have obtained acceptance in the market, it will be appreciated that the wide penetration into the market is hindered by this performance inadequacy.

Liquid crystal light shutters have also been developed as light transmission elements for eyewear. Some notable prior art is described in U.S. Pat. No. 4,279,474. In these devices, the electrically controllable birefringence of liquid crystals is exploited by sandwiching them between polarizers. In this implementation, the light transmissivity of the eyewear is controlled via an external electrical signal. Often, this signal is slaved to a photo sensor to produce responsive eyewear. A familiar example of such a device are the "automatic" windows in welding helmets that rapidly darken when a welding arc is struck, protecting the wearer's vision, as described in U.S. Pat. No. 4,039,254.

Attempts have been made to improve the aforementioned transition-half time by combining photochromic dyes with polymeric materials. However, these attempts have not improved the transition-half time and, in fact, are slower than the aforementioned imbibed device as disclosed in U.S. Pat. No. 6,773,108 B2. It is also known to use liquid crystal materials in combination with photochromic dyes as disclosed in U.S. Pat. No. 6,690,495. This disclosure reveals a marked improvement in the transition-half time. But, as with most all other liquid crystal devices, various other structural and processing features are required to enable such a device which can increase the cost and reduce the potential market size.

Other methods have been proposed to reduce processing, cost and transition half time. For example, devices using a combination of photochromic dyes with thermoplastic adhesives have been proposed. Cured adhesives, like polymers, can be categorized into thermoplastic or thermoset. Thermoplastic adhesives exhibit a glass transition temperature, Tg, above which the material can flow. This allows a material to be reversibly reshaped many times. Thermoplastics as a whole have many desirable properties suitable for optical applications including the ability to be injection molded and are considered the material of choice for this use. As such, thermoplastic adhesives have also been proposed as potential carriers of photochromic dyes. For example, Knox (U.S. Publication No. 2007/0177100 A1) and Gupta (International Publication No. WO 96/34735) both describe thermoplastic adhesives with impregnated photochromic dyes. Gupta further specifies a required Tg range for operation. These thermoplastic based devices demonstrate a marked improvement over existing products. Thermoset materials do not have a Tg, cannot be reversibly reshaped with an increase in temperature and cannot be injection molded. Furthermore, it was widely believed that use of a photochromic dye with a thermoset polymeric material would result in a significantly slower transition half time as compared with use of a photochromic dye in a liquid crystal material or thermoplastic materials. Accordingly, use of a thermoset adhesive in conjunction with a photochromic dye was not believed to provide any measurable benefit.

Therefore, there is a need in the art to provide a photochromic device that significantly improves the transition-half time over known photochromic devices. There is also a need for a photochromic device that does not require many of the components or structure normally associated with liquid crystal devices. And there is a need to manufacture such improved photochromic devices with readily available processing techniques which allow incorporation of the photochromic device with any number of optical elements.

DISCLOSURE OF INVENTION

It is thus an object of the present invention to provide photochromic devices and methods for making the same.

It is another object of the present invention to provide a mixture used in photochromic devices, the mixture comprising a photochromic dye and a thermoset adhesive.

Yet another object of the present invention is to provide an optical device, comprising a carrier substrate and a mixture disposed on the carrier substrate, the mixture comprising a photochromic dye and a thermoset adhesive.

Still another object of the present invention is to provide a method of manufacturing a photochromic device comprising mixing a photochromic dye and a thermoset adhesive, and providing the mixture on a carrier substrate.

Yet another object of the present invention is to provide a method of manufacturing a photochromic device comprising mixing a first photochromic dye and a first thermoset adhesive to provide a first mixture, mixing a second photochromic dye and a second thermoset adhesive to provide a second mixture and providing the first mixture and the second mixture on a carrier substrate.

BEST MODE FOR CARRYING OUT THE INVENTION

Figure 1:
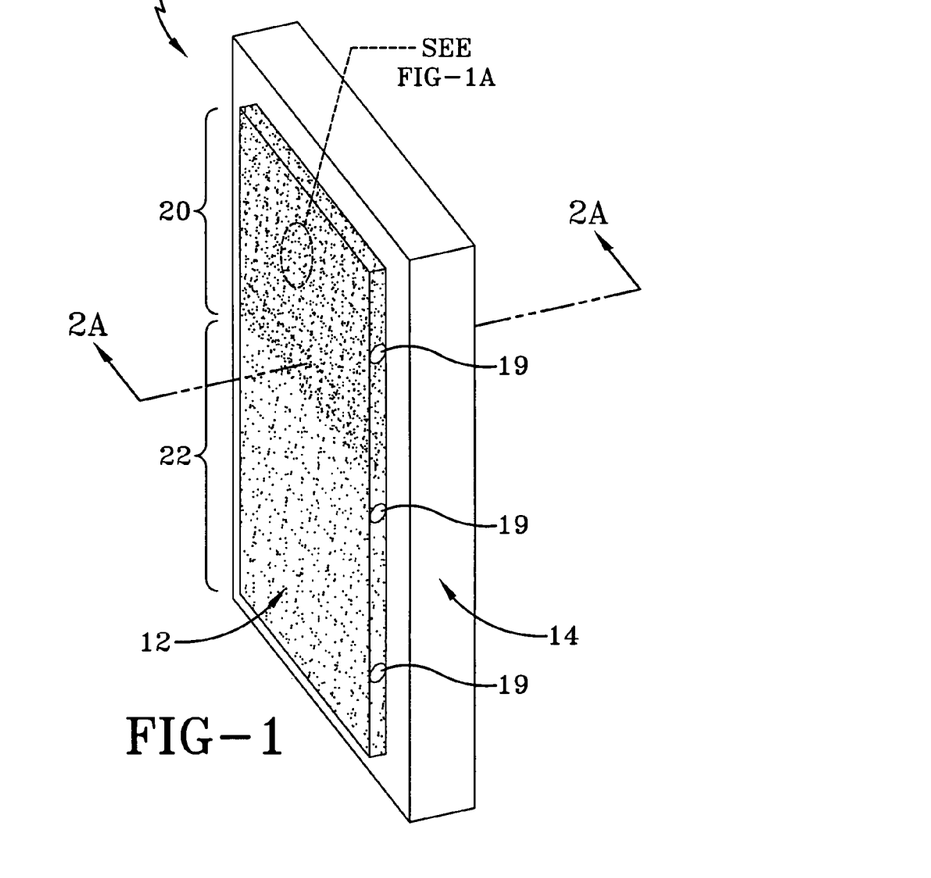
FIG. 1 is a perspective view of a photochromic device according to one embodiment of the present invention.
Figure 1A:
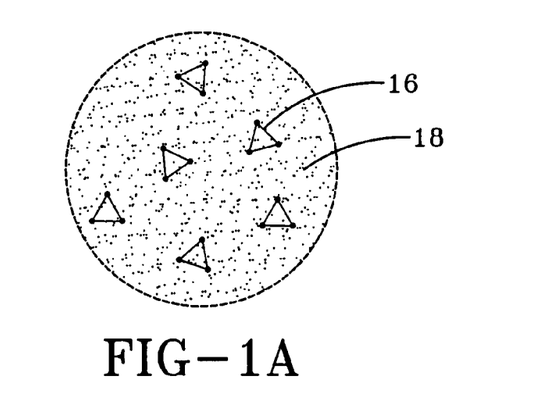
FIG. 1A is an enlarged schematic representation of a mixture comprising photochromic dye and thermoset adhesive in an un-actuated condition according to the present invention.

A photochromic device made in accordance with the concepts of the present invention is generally indicated by the numeral 10 in the accompanying drawings and is generally seen in FIGS. 1 and 1A. As will be discussed in further detail, the photochromic device 10 changes states or conditions upon exposure to ultraviolet light. In a basic embodiment, the photochromic device, upon exposure to ultraviolet light, changes from an un-actuated, or transmissive state, to an actuated or absorptive state. Upon removal of the ultraviolet light, the photochromic device reverts from the actuated/absorptive state to an un-actuated/transmissive state.

The photochromic device 10 includes a mixture, designated generally by the numeral 12, which is disposed or otherwise applied to a carrier substrate designated generally by the numeral 14. The substrate 14 may be any uniform material that is suitable for carrying the mixture 12. The substrate 14, and all other substrates used herein, may be rigid or flexible and of any appropriate thickness. If flexible, the substrate may be thermoformed or otherwise conformed to a desired curved, doubly curved or complex shape. In most embodiments, the carrier substrate 14 will be an optically clear, or transparent material; however, such is not required for practice of the invention. In other words, for eyewear or optical applications, it is believed that the carrier substrate 14 will be generally optically transparent; however, for other applications, such as for fashion accessories, it will be appreciated that the carrier substrate 14 may be opaque, reflective or colored. Examples of materials used for the substrates could be glass, thermoset materials, or thermoplastic materials including polycarbonate or polyethylene terephthalate (PET). It will further be appreciated that the substrate could be any textile or fabric material, leather, metallic and so on. Indeed, any material which can support an adhesive can support the mixture 12. Although the substrate 14 shown in FIG. 1 is flat, it will be appreciated that the substrate could be curved or doubly curved. And although any thickness material could be used, it will be appreciated that in most embodiments the substrate has a thickness of about 0.2 mils to about 10 mils.

Figure 2A:
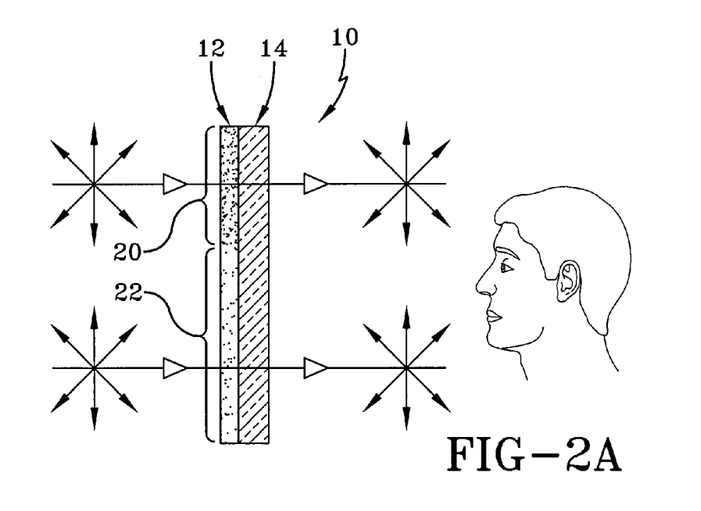
FIGS. 2A and 2B are schematic representations of the photochromic device shown in an un-actuated state (FIG. 2A) and an actuated state (FIG. 2B)
Figure 2B:
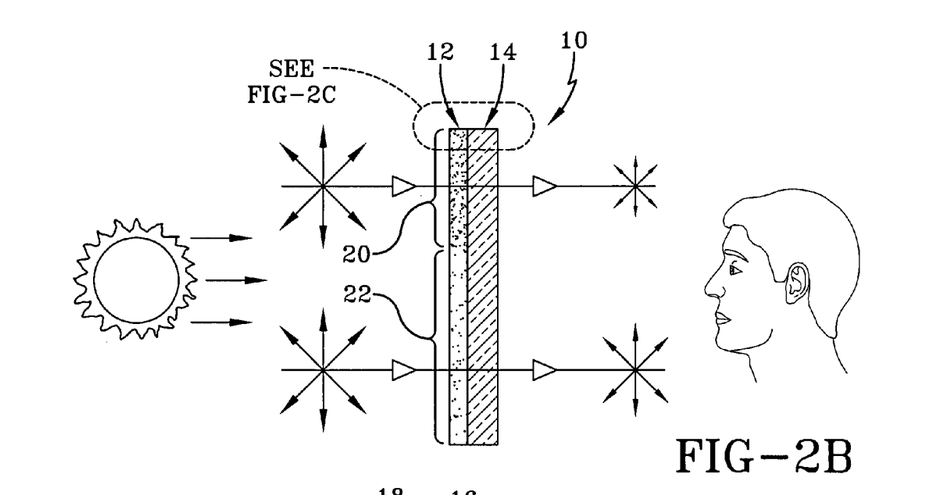
Figure 2C:
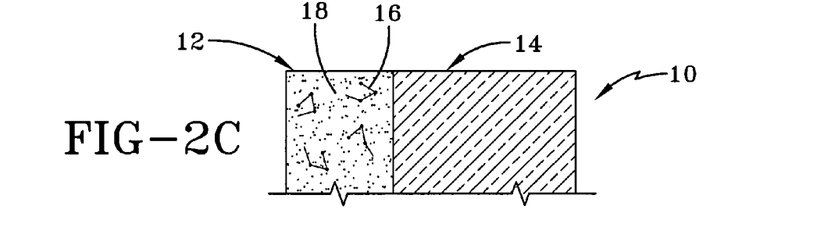
FIG. 2C is an enlarged view of the mixture with the photochromic dye in an actuated condition.

The mixture 12, schematically represented in FIG. 1A, comprises a photochromic dye 16, which for representational purposes is shown as a stick-and-ball shape in FIGS. 1A and 2C, and an adhesive 18. The photochromic dye 16 is intermixed in and carried by the adhesive material 18. If desired, appropriately sized spacers 19 may be included in the mixture. In some non-limiting embodiments, the photochromic material is an organic photochromic material that may be chosen from pyrans, oxazines, fulgides, fulgimides, diarylethenes and mixtures thereof. Non-limiting examples of photochromic pyrans that may be used herein include benzopyrans, and naphthopyrans, e.g., naphtho[1,2-b]pyrans, naptho[2,1-b]pyrans, indeno-fused naphthopyrans and heterocyclic-fused naphthopyrans, spiro-9-fluoreno[1,2-b]pyrans, phenanthropyrans, quinolinopyrans; fluoroanthenopyrans and spiropyrans, e.g., spiro(benzindoline)naphthopyrans, spiro(indoline)benzopyrans, spiro(indoline)naphthopyrans, spiro(indoline)quinolinopyrans and spiro(indoline)pyrans and mixtures thereof. In FIG. 1A, the photochromic dye 16 is represented by a triangular stick-and-ball shape and the adhesive is represented by dots. In FIG. 2C, upon exposure to ultraviolet light or other triggering mechanism, the photochromic dye 16 is represented by a broken or disconnected stick-and-ball shape.

The adhesive 18 is any thermoset adhesive that is compatible for use with a photochromic dye and allows the dye to function in a manner consistent with its intended operation. A thermoset adhesive is an adhesive that is generally cured by a chemical reaction and solidifies irreversibly. It will further be appreciated that a thermosetting adhesive does not exhibit a glass transition temperature. In an embodiment of the present invention, the thermoset adhesive 18 is an optical adhesive provided by such manufacturers as Norland or Loctite. Non-limiting examples of these adhesives are Norland 68 and Henkel-Loctite 349. It will be appreciated that optical adhesives are used in bonding substrates of optical elements to one another and, as such, provide low haze and optical clarity, and are virtually clear so as to provide transparent optical properties while allowing the bonding of substrates to one another. It will further be appreciated that the thermoset optical adhesives could be a pressure sensitive adhesive which is optically cured with visible or ultraviolet light, or thermally cured. The adhesive 18 may comprise an acrylate, a cyanoacrylate, or other like materials. It will be appreciated that the amount of dye used with the adhesive is dependent on the solubility of the dye within the thermoset adhesive material. Accordingly, the dye may range from about 0.1% to about 20% of the entire mixture with the thermoset adhesive 18. In some embodiments, the concentration of the photochromic dye 16 with respect to the adhesive 18 ranges anywhere from about 1% to about 10%. As will be discussed in detail later, the amount of the impinging light that the mixture 12 absorbs is dependent upon the amount of dye used within the mixture and the amount of ultraviolet light applied to the device.

Briefly, in the device's most basic form, the mixture 12 is applied or otherwise disposed on the carrier substrate 14 in any thickness. In some embodiments, the thickness of mixture 12 ranges from about 5 microns to about 150 microns. The mixture is then selectively cured in a manner consistent with the selected adhesive 18. As noted previously, one factor in the amount of light absorption of the device 10 is controlled by the amount of dye in the mixture. In other words, the use of more dye in the mixture results in more absorption of the impinging light, whereas a lower amount of dye results in comparatively less absorption of light impinging upon the material. Likewise, the dye can control the color, wavelength or range of wavelengths of light that can be absorbed. As such, different mixtures can be applied to a single substrate. This is exemplified in FIG. 1 wherein a first area 20 comprises a first concentration or color of mixture 12. A second area 22 of the device 10 may be provided with a second concentration, different from the first concentration utilizing a same color of dye. And, in the alternative, the second area 22 may utilize a mixture which has a different color which is distinguishable from the color utilized in the first area 20. In other words, the first area 20 may have a first concentration of dye that absorbs more light upon exposure to an ultraviolet light than a second area 22 which may utilize the same color but have a lower concentration of dye. In a similar manner, different tints or colors may be absorbed by utilizing a different color dye in a corresponding mixture 12. Any number of distinguishing areas (dye color, dye concentration or combinations thereof) could be used.

Use of different dye concentrations, and different dye colors, and their selective application on substrates allows for any number of end-use applications. Indeed, it is envisioned that such selective applications of the mixture would allow for formation of trademarks or logos on any number of products. Use in this manner could be used to establish brand recognition or provide an anti-counterfeiting mechanism. For example, the mixture 12 could be applied in a discrete area which when illuminated with UV light would show a trademark, bar code or other recognizable symbol or indicia. Lack of such a mark would be evidence of a counterfeit product.

Referring now to FIG. 2A, it can be seen that the photochromic device 10 is in an un-actuated condition. In other words, the light impinging on the device, as represented by the arrows on the left side of the device, opposite the representation of a human eye on the right side of the device, impinges upon the device 10 and is transmitted therethrough without any change to the appearance of the light.

FIG. 2B illustrates the presence of ultraviolet light emanating from the sun or any other ultraviolet light source on the left side of the device opposite the human eye represented on the right side of the device. Exposure of ultraviolet light to the device 10, and in particular the mixture 12, causes a state change of the photochromic dye 16 as seen in FIG. 2C. As such, in the first area 20 a significant portion of the impinging light is absorbed as represented by the light configuration of reduced magnitude on the right side of the device. Likewise, the second area 22 of the device 10 also absorbs a portion of light, but not as much as in the area 20. The light representation characteristics shown on the right side of the device are indicative of the light being absorbed.

Figure 3A:
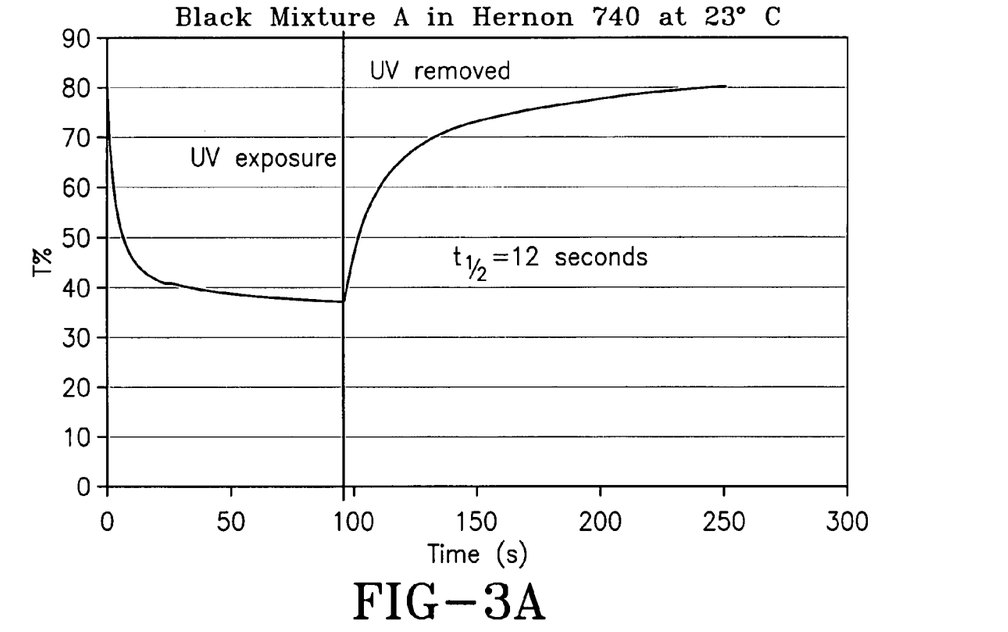
FIGS. 3A and 3D are graphical representations of the transition time for photochromic devices to change from an un-actuated state to an actuated state and from an actuated state to an un-actuated state.
Figure 3B:
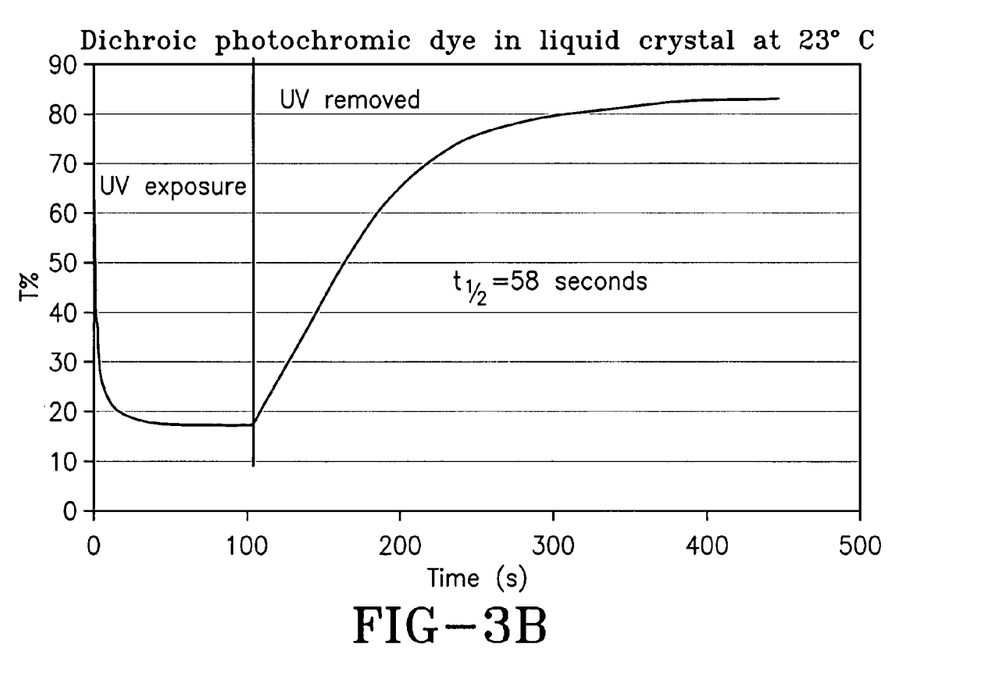
FIG. 3B is a graphical representation of transition time characteristics of a prior art device which uses photochromic dye in liquid crystal.
Figure 3C:
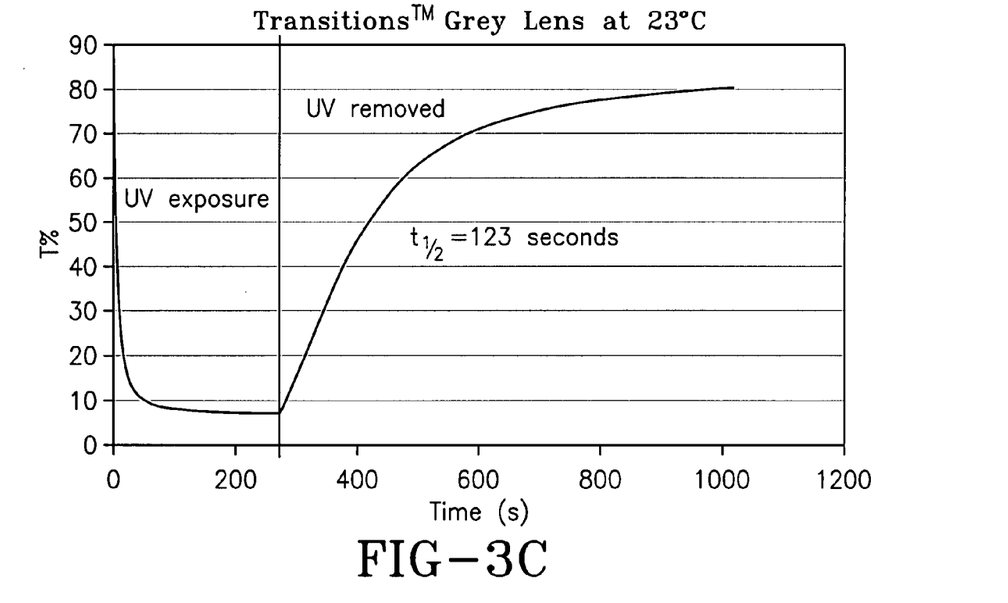
FIG. 3C is a graphical representation of transition time characteristics of a prior art Transitions™ grey lens.
Figure 3D:
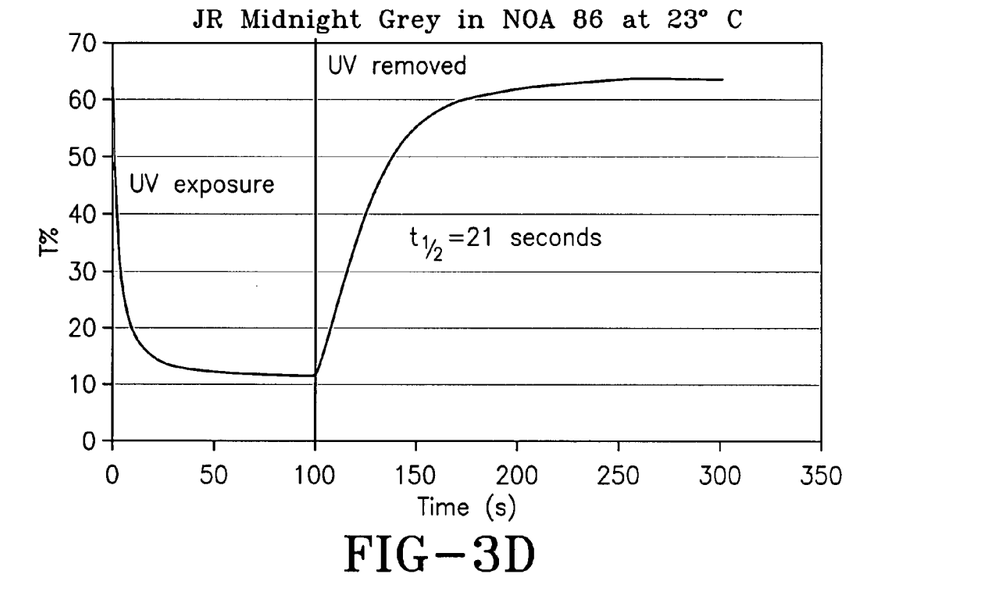

The time characteristics for a device utilizing the mixture 12 (see Example 3 below) is shown in FIG. 3A, wherein the graph shows the amount of time it takes from initial exposure to ultraviolet light to a complete absorptive state, and the amount of time required to change from an actuated state to an un-actuated state upon removal of an ultraviolet light source upon the device 10. A comparable time characteristics curve for a dichroic photochromic dye in liquid crystal is shown in FIG. 3B, and a similar one for a commercially available Transitions™ grey lens is shown in FIG. 3C. Yet another comparable time characteristics of the device 10 made from a commercially available photochromic dye in an optical thermoset adhesive (see Example 1 below) is shown in FIG. 3D.

It was widely believed that use of a photochromic dye with a thermoset polymeric material would result in a significantly slower transition half time as compared with use of a photochromic dye in a liquid crystal material. Notably, known examples of devices utilizing a photochromic dye with a liquid crystal material have a transition half time ranging from about 50-100 seconds in length. Accordingly, use of a thermoset adhesive material in conjunction with a dye was not believed to provide any measurable benefit. However, it was found that the mixture of device 10 had faster transition times as evidenced in FIGS. 3A and 3D. These results were quite unexpected. And use of thermoset polymer adhesives provides a mixture with optical properties that are less affected by temperature variation.

Figure 4:
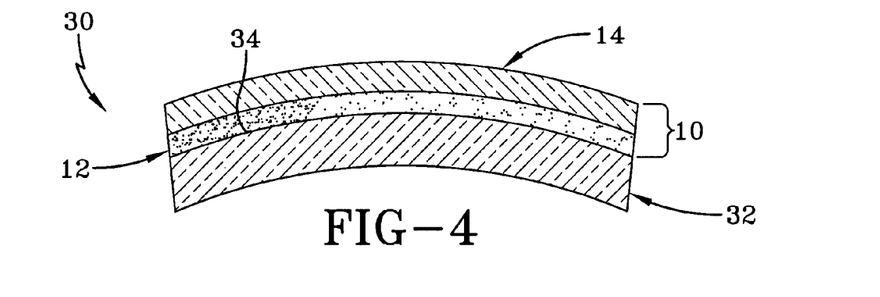
FIG. 4 is a schematic representation of the photochromic device coupled to a lens.

The optical device 10 as shown in FIG. 1 may be incorporated into a number of other optical assemblies. In particular, FIG. 4 shows an optical assembly designated generally by the numeral 30. The optical assembly includes a lens 32 which is shown as curved, but it will be appreciated that a flat lens or equivalent flat or non-uniform substrate could be employed. The lens 32 provides an attaching surface 34 wherein the device 10 is positioned such that the mixture 12 is captured or disposed between the carrier substrate 14 and the lens 32. In some embodiments, the mixture 12 may be applied to the substrate 14 and then partially cured. In other words, the mixture 12 is partially solidified in such a manner so as to provide a tacky quality to the mixture so that it remains on the substrate without difficulty. Or the mixture 12 may be applied to the substrate 14 and fully cured. Alternatively, the mixture 12 could be left temporarily uncured and cured at a later time as necessitated by processing requirements. The device 10 is then brought next to the surface 34 and positioned accordingly. Then, if needed, the curing process is completed to finish the optical assembly 30. Accordingly, the optical device 10 may be associated with the lens 32 by any number of processes, such as lamination, thermoforming, insert forming and the like. If a thermoforming process is used to shape or re-shape the substrate 14 and/or the lens 32, care must be taken so that the thermoset properties of the adhesive are not adversely affected.

Figure 5:
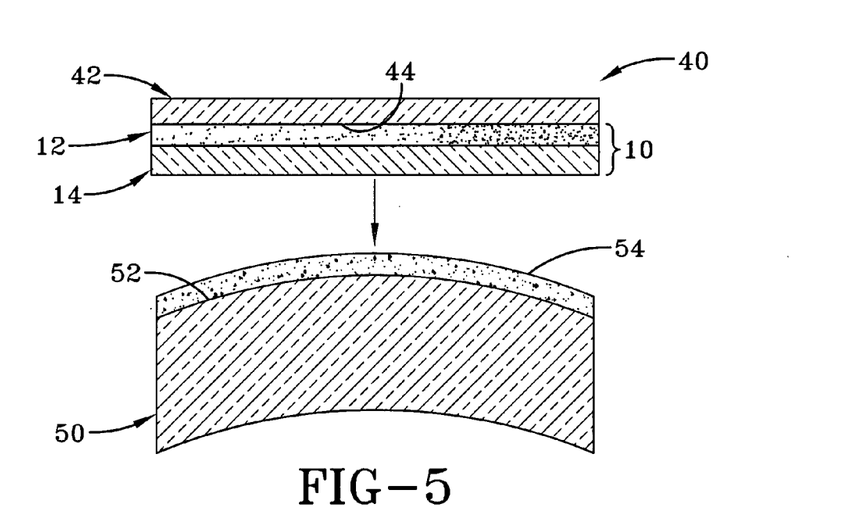
FIG. 5 is a schematic representation of the photochromic device associated with a cover substrate and positioned proximal to a lens.
Figure 6:
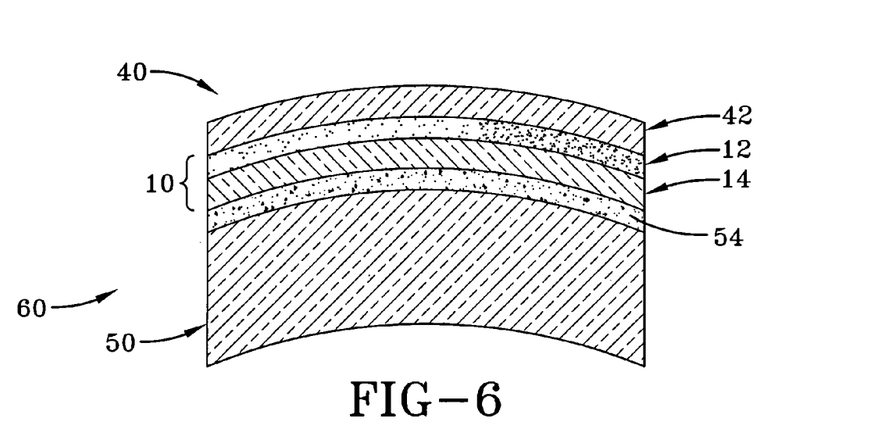
FIG. 6 is a cross-sectional view of the photochromic device assembled to the lens according to another embodiment of the present invention.

FIG. 5 shows another embodiment using the optical device 10. Specifically, FIG. 5 shows an optical assembly designated generally by the numeral 40. In this configuration, a cover substrate 42, which can be constructed of the same material as provided by the carrier substrate 14, is provided. It will be appreciated that the cover substrate may be provided in a flat configuration as shown or may be curved in a single or double curvature configuration. And the cover substrate may be of any thickness which in most embodiments may range from 0.2 mils to about 10 mils. In any event, the substrate 42 provides a surface 44 which is positioned adjacent the mixture 12. Accordingly, the mixture 12 is positioned between the substrates 14 and 42. The mixture 12 may be first partially cured and then positioned adjacent the substrate 42 and then completely cured. In another example, the mixture 12 may be applied to the substrate 14 and fully cured. Or, in the alternative, the uncured mixture 12 may be disposed between the substrate 14 and the cover substrate 42, whereupon the mixture is cured in a single uninterrupted step. Such an optical assembly 40 may then be formed or otherwise manipulated into a desired shape as required by the end use. For example, the typical assembly may be assembled to a lens 50 which provides a lens surface 52 wherein an optical adhesive 54 is applied to the lens surface so as to receive attachment of the optical assembly 40. Indeed, such a configuration is shown as an optical assembly, designated generally by the numeral 60, as shown in FIG. 6. It will further be appreciated that the optical adhesive 54 could be incorporated with a photochromic dye in much the same manner as mixture 12 so as to provide another specialized configuration of the optical assembly exhibiting the desired photochromic characteristics.

Figure 7:
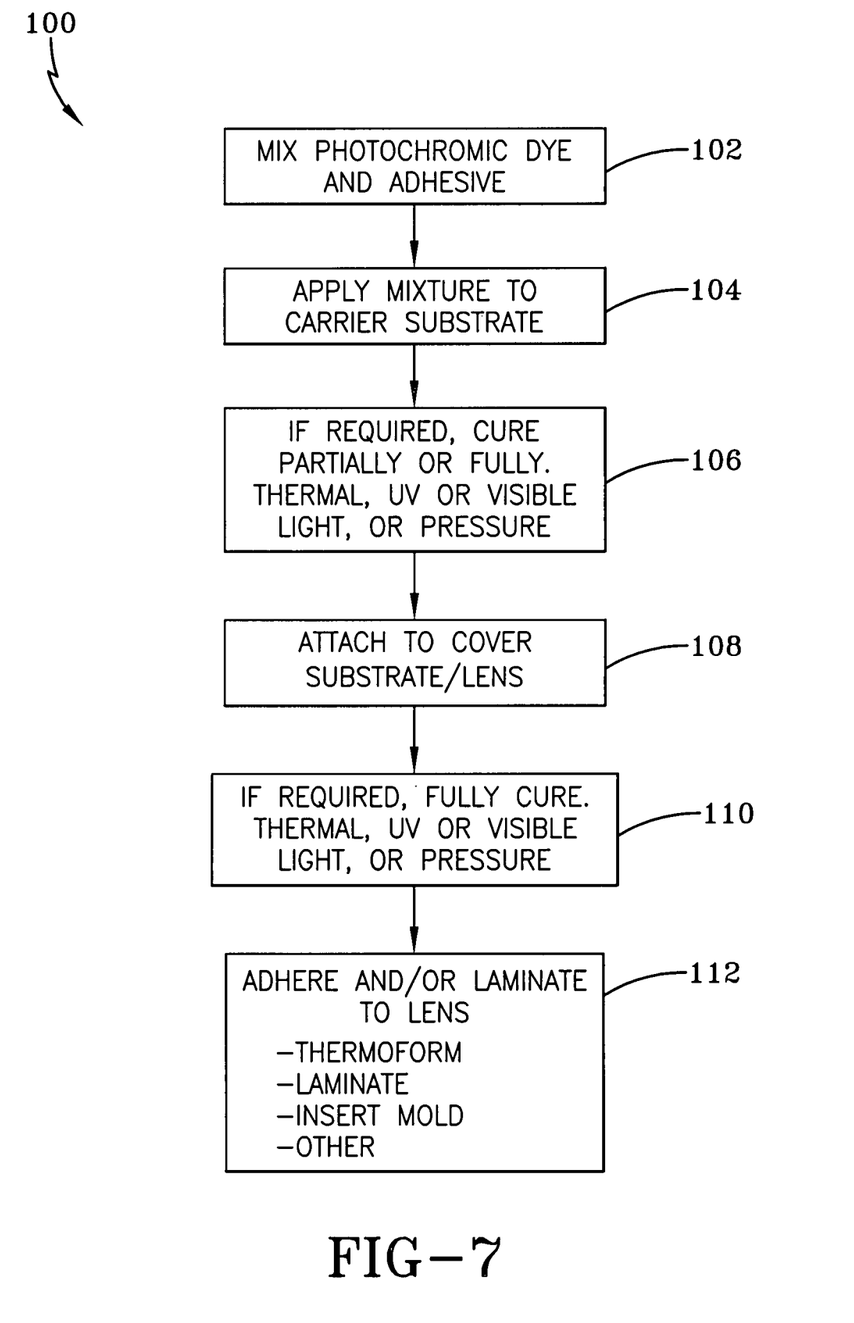
FIG. 7 is a flow chart of manufacturing steps utilized in making a photochromic device according to the present invention.

Referring now to FIG. 7, a non-limiting manufacturing process for making an optical device 10 for use with optical assemblies 30, 40 or 60, is designated generally by the numeral 100. Initially, at step 102, a photochromic dye and a thermoset adhesive are mixed according to the proportions as described above. If desired, appropriately sized spacers 19 may be added to the mixture. It will be appreciated that such a mixture may be mixed in volume and stored in a manner consistent with the adhesive material's normal storage requirements. Next, at step 104, the mixture is applied to a carrier substrate in any number of manners. The mixture may be printed utilizing an ink-jet print mechanism, or any other common manner for disposing adhesive on a substrate to be used in a liquid crystal display. Alternatively, the mixture may be applied as a dip or sprayed on in a uniform and even manner upon the carrier substrate in thickness ranging anywhere form about 3 to about 200 microns. In some embodiments, the thickness of the mixture can range anywhere from about 5 to about 150 microns.

The mixture may be selectively applied to a carrier substrate to provide only partial coverage thereof or full coverage depending upon the desired optical appearance. It will further be appreciated that the mixture may be selectively applied to a carrier substrate so as to provide a number of graphical patterns to the finished optical device/optical assembly. For example, differing tints may be applied based upon the selection of the photochromic dye, and/or different concentrations of dye. As a further example, a more absorptive tint may be used on a top horizontal edge of eyewear and a less absorptive tint may be used on a lower edge of the eyewear. Such a configuration would allow for more absorptive tinting when the user looks over a far distance and minimal tinting where the user looks at objects up close. Indeed, it will be appreciated that such tinting could be done in a blended manner so as to provide for a fairly unnoticeable transition between a dark tinted area and a lightly tinted area. In a similar manner, different colored tints, or photochromic dye tints, could be selectively applied to a substrate to provide a similar feature. Moreover, such selective application of a photochromic dye could be utilized to provide signage or decorative displays depending on the requirements of an end-user. Such configurations could be utilized for display windows, artwork, fashion devices, trademarks, symbols, anti-counterfeiting indicia, or accessories such as jewelry. Moreover, such optical devices could be utilized with car windshields, visors, and any other number of optical devices. Such selective application of the photochromic mixture could also be applied to any number of compatible substrates.

In a variation of steps 102 and 104, the photochromic dye and a solvent may be mixed and then applied to a carrier substrate which has pressure sensitive adhesive already disposed thereon and the adhesive and dye intermix to form the mixture 12. After the solvent has evaporated, the process continues as described below.

At step 106 the mixture may be left uncured. Or the mixture could be partially cured or fully cured by application of heat, visible or ultraviolet light, the application of pressure or any other catalyst that initiates curing of the adhesive material. At step 108, a cover substrate or lens is positioned adjacent the mixture. At step 110, if required, the mixture is then completely cured so as to secure the carrier substrate to the cover substrate and/or lens as provided. At step 112, such a sub-optical assembly may then be adhered and/or laminated to another lens as shown in FIG. 6. The sub-optical assembly may be attached and otherwise secured to the carrier substrate and/or lens by a thermoforming, laminating, insert molding or other process. It will further be appreciated that in a lamination process, application of heat and/or pressure may be utilized to complete the cure of the mixture. In other words, steps 110 and 112 could be completed in a single manufacturing process.

EXAMPLE 1

A mixture with a total weight of 1 gram which contains 5% (weight) of a commercially available photochromic dye Reversacol Midnight Grey from James Robinson Ltd. of West Yorkshire, England, and 95% (weight) of a commercially available optical adhesive NOA 68 from Norland Products were mixed in a clear 50 ml vial. About 2% (weight) plastics spherical spacers with a diameter of 20 micrometers were added into the above mixture. The mixture was constantly stirred and heated at 100° C. for 10 minutes or until all the dye was dissolved. Then the mixture was transferred onto a piece of PET with a thickness of 50 micrometers. Another piece of the same type of PET film was then placed on top of the mixture, and the "sandwich" type sample was gently squeezed with a roller to achieve even thickness which is 20 micrometers as controlled by the plastic spacers. The sample was then exposed to UV light by an ELC 4001 light curing unit from ElectroLite Corporation. The sample was exposed for 5 minutes on one side and then 5 minutes on the other side. The spectral characteristics of the sample were measured using an Ocean Optics Spectrometer, and the results are shown in FIG. 3D. The actuated state has a percent transmission (T %) of about 11%, and the un-actuated state has a T % of about 64%.

EXAMPLE 2

A mixture with a total weight of 1 gram which contains 2% (weight) of a commercially available photochromic dye Sea Green from James Robinson Ltd. of West Yorkshire, England, and 98% (weight) of a commercially available optical adhesive Loctite 349 from Henkel-Loctite Corporation were mixed in a clear 50 ml vial. About 2% (weight) plastics spherical spacers with a diameter of 20 micrometers were added into the above mixture. The mixture was constantly stirred and heated at 100° C. for 10 minutes or until all the dye was dissolved. Then the mixture was transferred onto a piece of PET with a thickness of 50 micrometers. Another piece of the same type of PET film was then placed on top of the mixture, and the "sandwich" type sample was gently squeezed with a roller to achieve even thickness which is 20 micrometers as controlled by the plastic spacers. The sample was then exposed to UV light by an ELC 4001 light curing unit from ElectroLite Corporation. The sample was exposed for 5 minutes on one side and then 5 minutes on the other side. The sample exhibits optical and transition properties as described with device 10.

EXAMPLE 3

A mixture with a total weight of 1 gram which contains 5% (weight) of a neutral black dye mixture (identified as Black Mixture A in FIG. 3-A) consisting of a naphthopyran photochromic dye synthesized by AlphaMicron, Inc. and 95% (weight) of a commercially available optical adhesive Hernon 740 from Hernon Manufacturing, Inc. were mixed in a clear 50 ml vial. About 2% (weight) plastics spherical spacers with a diameter of 20 micrometers were added into the above mixture. The mixture was constantly stirred and heated at 100° C. for 10 minutes or until all the dye was dissolved. Then the mixture was transferred onto a piece of PET with a thickness of 50 micrometers. Another piece of the same type of PET film was then placed on top of the mixture, and the "sandwich" type sample was gently squeezed with a roller to achieve even thickness which is 20 micrometers as controlled by the plastic spacers. The sample was then exposed to UV light by an ELC 4001 light curing unit from ElectroLite Corporation. The sample was exposed for 5 minutes on one side and then 5 minutes on the other side. The spectral characteristics of the sample were measured using an Ocean Optics Spectrometer. As seen in FIG. 3A, the actuated state has a percent transmission (T %) of about 37%, and the un-actuated state has a T % of about 80%.

EXAMPLE 4

A mixture with a total weight of 20 grams which contained 0.5% (weight) of a naphthopyran photochromic dye synthesized by AlphaMicron, Inc., and 99.5% (weight) of toluene was mixed in a clear 100 ml beaker. The mixture was constantly stirred at room temperature until all the dye was dissolved. A 1 inch by 3 inch piece of optically clear pressure sensitive adhesive (PSA) was cut from a larger sheet of 3M Optically Clear Laminating Adhesive 8142, which consists of an acrylic PSA layer with a thickness of 50 microns carried between between two release liners. One release liner was peeled off and the exposed adhesive was then dipped in the above toluene solution for 5 seconds and then removed. The PSA film was then immediately placed onto a 60° C. hot plate with the adhesive side facing up to dry off the toluene. The dried PSA was then laminated onto a piece of PET with a thickness of 50 micrometers with a roller. The remaining release liner was then peeled off and another sheet of the same PET was laminated on top of the PSA in the same fashion. The sample exhibited optical and transition properties as described with device 10.

Based upon the foregoing description and provided examples, it is readily apparent that there are a number of advantages for utilizing the device 10 and associated optical assemblies as described above. A first primary advantage is that the mixture described above provides significant reduction in the transition time it takes to change from an actuated state to an un-actuated state and also from an un-actuated state to an actuated state.

Yet another advantage of the present invention is that the device is easier to manufacture than other photochromic devices. Namely, there is no requirement to imbibe or otherwise incorporate photochromic dyes into a glass material, nor is there a requirement to incorporate the photochromic dye into liquid crystal materials. Such a construction requires filling of opposed substrates with a liquid crystal material or providing substrates with electrodes, alignment layers and other attributes associated with liquid crystal devices. The optical device 10 is relatively inexpensive to manufacture and allows for end users to provide a significantly higher number of tint options due to the lowered cost and ease with which such a configuration can be made. Still another advantage of the present invention is that when the mixture 12 is applied to a flexible carrier substrate, the device 10 is adaptable for lamination and other manufacturing techniques. As such, the use of the photochromic material is adaptable for any number of substrate configurations.

It is further believed that the photochromic device is manufacturable with existing screen printing or ink-jet technology. As such, such a mixture or device can be easily adapted to conveyor or web-line type manufacturing systems. Additionally, the invention is advantageous in that the carrier substrates and cover substrates, if utilized, can be easily shaped and sized to a desired end configuration. The present invention is also advantageous in that it provides a potentially wide transmission window in a quick manner. In other words, the prudent selection of photochromic dyes allows for a transmission characteristic that is essentially optically clear to a state that is essentially optically blocking. The transmission range of the devices manufactured may range anywhere from 10% to 80% transmission levels. In other words, transmission levels, as shown in the examples, can range between 11% to 64%, and from 37% to 80%. It is believed, that with refinement and determination of compatability with the aforementioned dyes and adhesives, a broader transmission range can be obtained.

Still another advantage is that use of a thermoset adhesive with a photochromic dye allows an optical device configuration that provides enhanced temperature stability over devices that utilize thermoplastic adhesives. Eyewear is envisioned to be a typical application of the optical device disclosed herein. Eyewear is commonly left in closed automobiles, which on sunny days can reach very high temperatures. Such extreme temperatures can quickly degrade the performance of optical devices using thermoplastic adhesives. The lack of glass transition temperature of the thermoset adhesives can overcome this issue. Accordingly, optical devices of the present disclosure exhibit superior longevity over prior art devices.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:
1. A mixture used in photochromic devices, the mixture comprising:
 a photochromic dye; and
 a sufficient amount of a thermoset pressure sensitive adhesive so that said mixture solidifies irreversibly when cured and does not exhibit a glass transition temperature, wherein said photochromic dye is an organic photochromic material selected from a pyran, an oxazine, a fulgide, a fulgimide, a diarylethene and mixtures thereof.

2. The mixture according to claim 1, wherein said mixture comprises anywhere from 0.1% to 20% photochromic dye.

3. The mixture according to claim 2, wherein said mixture comprises anywhere from 1% to 10% photochromic dye.

4. The mixture according to claim 1, further comprising spacers.

5. The mixture according to claim 1, wherein a transition half time from an actuated state to an un-actuated state is less than 20 seconds.

6. The mixture according to claim 1, wherein said mixture has a transition half time from an actuated state to an un-actuated state that is less than 50 seconds.

7. An optical device, comprising:
a carrier substrate; and
a mixture disposed on a first area of said carrier substrate, said mixture comprising a photochromic dye and a sufficient amount of a thermoset pressure sensitive adhesive wherein said mixture solidifies irreversibly when cured and does not exhibit a glass transition temperature, and wherein said photochromic dye is an organic photochromic material selected from a pyran, an oxazine, a fulgide, a fulgimide, a diarylethene and mixtures thereof.

8. The optical device according to claim 7, wherein said mixture comprises anywhere from 0.1% to 20% photochromic dye.

9. The optical device according to claim 8, wherein said mixture comprises anywhere from 1% to 10% photochromic dye.

10. The optical device according to claim 7, wherein said mixture further comprises spacers.

11. The optical device according to claim 7, further comprising:
a lens, wherein said mixture is disposed between said carrier substrate and said lens.

12. The optical device according to claim 11, wherein said carrier substrate and said mixture conform to a curvature of said lens.

13. The optical device according to claim 7, wherein said carrier substrate is selected from the group consisting of glass, thermoplastic, and thermoset materials.

14. The optical device according to claim 7, further comprising:
a cover substrate, wherein said mixture is disposed between said carrier substrate and said cover substrate, said cover substrate selected from the group consisting of glass, thermoplastic, and thermoset materials.

15. The optical device according to claim 14, further comprising:
a lens positioned adjacent one of said carrier substrate and said cover substrate.

16. The optical device according to claim 15, wherein said carrier and cover substrates conform to a curvature of said lens.

17. The optical device according to claim 15, wherein an optical adhesive secures said lens to one of said substrates.

18. The optical device according to claim 17, wherein said optical adhesive further comprises a photochromic dye.

19. The optical device according to claim 7, wherein said mixture disposed on said carrier substrate has a thickness ranging from 3 microns to 200 microns.

20. The optical device according to claim 7, further comprising a second mixture comprising a second photochromic dye and a second pressure sensitive adhesive disposed on a second area of said carrier substrate.

21. The optical device according to claim 7, wherein said optical device has a transition half time less than 20 seconds.

22. The optical device according to claim 7, wherein said mixture has a transition half time from an actuated state to an un-actuated state that is less than 50 seconds.

23. An optical device, comprising:
a first photochromic dye having a first color and concentration and a first thermoset pressure sensitive adhesive to provide a first mixture that solidifies irreversibly when cured and does not exhibit a glass transition temperature disposed on a first area of a carrier substrate wherein said first photochromic dye is an organic photochromic material selected from a pyran, an oxazine, a fulgide, a fulgimide, a diarylethene and mixtures thereof;
a second photochromic dye having a second color and concentration and a second thermoset pressure sensitive adhesive to provide a second mixture disposed on a second area of said carrier substrate,
wherein said first color is different from said second color, said first concentration is different from said second concentration or a combination thereof,
and wherein the first and second areas partially or totally overlap.

* * * * *